(12) United States Patent
Tang et al.

(10) Patent No.: US 12,555,797 B2
(45) Date of Patent: Feb. 17, 2026

(54) POSITIVE ELECTRODE SHEET CONTAINING HIGH-SAFETY HEAT-SENSITIVE COATING AND LITHIUM-ION BATTERY

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Ruofan Chen, Zhuhai (CN); Chunyang Liu, Zhuhai (CN); Junyi Li, Zhuhai (CN); Yanming Xu, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 569 days.

(21) Appl. No.: 18/059,192

(22) Filed: Nov. 28, 2022

(65) Prior Publication Data

US 2023/0095575 A1 Mar. 30, 2023

Related U.S. Application Data

(63) Continuation of application No. PCT/CN2021/094176, filed on May 17, 2021.

(30) Foreign Application Priority Data

May 29, 2020 (CN) .......................... 202010479690.9

(51) Int. Cl.
*H01M 4/62* (2006.01)
*H01M 10/0525* (2010.01)
(Continued)

(52) U.S. Cl.
CPC .......... *H01M 4/628* (2013.01); *H01M 4/624* (2013.01); *H01M 10/0525* (2013.01);
(Continued)

(58) Field of Classification Search
CPC .......... H01M 4/13; H01M 4/139; H01M 4/36; H01M 4/62; H01M 10/0525; H01M 10/42; H01M 50/581; H01M 50/586
(Continued)

(56) References Cited

U.S. PATENT DOCUMENTS

| | | | | |
|---|---|---|---|---|
| 4,924,074 A | * | 5/1990 | Fang | ...................... H01C 7/021 |
| | | | | 219/541 |
| 7,271,369 B2 | * | 9/2007 | Li | ........................... H01C 7/18 |
| | | | | 219/505 |

(Continued)

FOREIGN PATENT DOCUMENTS

| CN | 101471435 A | 7/2009 |
|---|---|---|
| CN | 104409681 A | 3/2015 |

(Continued)

OTHER PUBLICATIONS

The first examination opinion dated Oct. 28, 2022 for Chinese Application No. 202010479690.9.

(Continued)

*Primary Examiner* — Brian K Talbot

(57) ABSTRACT

A positive electrode sheet containing a high-safety heat-sensitive coating and a lithium-ion battery containing the positive electrode sheet are provided. The heat-sensitive coating includes a first conductive agent, a first binder, heat-sensitive polymer microspheres and an auxiliary agent, and has a conductive property at normal temperature and also has advantages of increasing a contact area between an active material and a current collector, improving the conductivity, and effectively reducing the polarization of battery and the like; when the use temperature of the positive electrode sheet reaches 120° C. and above, the heat-sensitive polymer microspheres will melt to form a plurality of continuous electron blocking layers, current blocking occurs (Continued)

in the coating, an internal blocking forms inside the battery, thereby preventing the occurrence of further thermal runaway of lithium-ion battery.

13 Claims, 4 Drawing Sheets

(51) Int. Cl.
  *H01M 4/02* (2006.01)
  *H01M 4/13* (2010.01)
  *H01M 4/139* (2010.01)
  *H01M 4/36* (2006.01)
  *H01M 50/581* (2021.01)
  *H01M 50/586* (2021.01)

(52) U.S. Cl.
  CPC ............ *H01M 2004/021* (2013.01); *H01M 2004/028* (2013.01); *H01M 4/13* (2013.01); *H01M 4/139* (2013.01); *H01M 4/36* (2013.01); *H01M 4/62* (2013.01); *H01M 50/581* (2021.01); *H01M 50/586* (2021.01)

(58) Field of Classification Search
  USPC ........................................................ 429/233
  See application file for complete search history.

(56) References Cited

U.S. PATENT DOCUMENTS

| | | | |
|---|---|---|---|
| 9,627,722 B1* | 4/2017 | Fan | C09D 179/08 |
| 10,608,289 B2* | 3/2020 | Kim | H01M 10/4235 |
| 11,069,947 B2* | 7/2021 | Ose | H01M 4/13 |
| 11,108,049 B2* | 8/2021 | Ose | H01G 11/04 |
| 11,362,317 B2* | 6/2022 | Ose | H01M 10/0525 |
| 2007/0146112 A1* | 6/2007 | Wang | H01C 1/1406 338/22 R |
| 2008/0241684 A1* | 10/2008 | Muraoka | H01M 10/0587 427/58 |
| 2013/0130075 A1* | 5/2013 | Kim | H01M 4/366 429/62 |
| 2015/0221449 A1* | 8/2015 | Saito | H01G 11/50 252/511 |
| 2017/0331146 A1* | 11/2017 | Haba | H01M 4/663 |
| 2019/0140280 A1* | 5/2019 | Zhang | H01G 11/84 |
| 2019/0140281 A1* | 5/2019 | Li | H01M 4/1315 |
| 2020/0266448 A1* | 8/2020 | Osada | H01M 10/0525 |

FOREIGN PATENT DOCUMENTS

| | | |
|---|---|---|
| CN | 104810507 A | 7/2015 |
| CN | 106654165 A | 5/2017 |
| CN | 107004858 A | 8/2017 |
| CN | 108091825 A | 5/2018 |
| CN | 108475749 A | 8/2018 |
| CN | 109713312 A | 5/2019 |
| CN | 109755467 A | 5/2019 |
| CN | 110444764 A | 11/2019 |
| CN | 110931710 A | 3/2020 |

OTHER PUBLICATIONS

Search Report and Written Opinion dated Jun. 29, 2021 for International Application No. PCT/CN2021/094176.

* cited by examiner

POSITIVE ELECTRODE SHEET CONTAINING HIGH-SAFETY HEAT-SENSITIVE COATING AND LITHIUM-ION BATTERY

CROSS-REFERENCE TO RELATED APPLICATIONS

The present application is a continuation of International Application No. PCT/CN2021/094176, filed on May 17, 2021, which claims priority to Chinese Patent Application No. 202010479690.9, filed with the China National Intellectual Property Administration on May 29, 2020. The disclosures of the aforementioned applications are incorporated herein by reference in their entireties.

TECHNICAL FIELD

The present disclosure relates to the field of high-safety secondary batteries, in particular to a positive electrode sheet containing a high-safety heat-sensitive coating and a lithium-ion battery containing the positive electrode sheet.

BACKGROUND

A secondary battery mainly includes a lithium-ion battery, a lead acid battery, a sodium-ion battery, a fluoride-ion battery, a zinc-ion battery, a nickel hydrogen battery and other secondary batteries. Among them, the lithium-ion battery has the advantages of high energy density, long life and environmental friendliness, and at present, it is mainly applied to fields such as energy storage, digital electronics, and electric vehicles. In recent years, the market has put forward higher energy density requirements for the lithium-ion battery, and a conventional lithium-ion battery is mainly composed of a positive electrode, a negative electrode, an electrolyte and a separator. As the electrolyte in the lithium-ion battery is mainly composed of organic solvent, there may be safety problems such as liquid leakage, fire, and explosion during use of the battery.

In order to improve the safety of the lithium-ion battery, the main schemes include a PTC (Positive Temperature Coefficient) coating, a high-safety separator, a high-safety electrolyte, a PTC tab and so on at present. The high-safety separator is mainly directed to improvement of a safety substrate, a safety coating, etc.; the high-safety electrolyte is mainly directed to development of high-safety additives, high-safety flame retardants, etc. The PTC coating has good safety, and now there are mainly a PTC device outside the secondary battery and a PTC device inside the secondary battery; where the main representative of the PTC device outside the secondary battery is the PTC tab, and the main representative of the PTC device inside the secondary battery is the PTC coating. Currently, some progress has been made in the directions of the high-safety separator, the high-safety electrolyte and the PTC tab, but the improvement effect is limited.

At present, the key direction of improvement is to develop a high-safety PTC coating inside the lithium-ion battery. In practical applications, the current PTC coating has the problems of higher resistance, poor thermal insulation, bad solvent compatibility, poor PTC effect, and so on.

SUMMARY

In order to improve the above disadvantages, the present disclosure aims to provide a positive electrode sheet containing a heat-sensitive coating and a lithium-ion battery containing the positive electrode sheet. The heat-sensitive coating is coated on a surface of a current collector, which, on the one hand, does not affect the electronic conductivity of the lithium-ion battery in normal environment, and on the other hand, can improve the safety performance of the lithium-ion battery.

The purpose of the present disclosure is achieved by the following technical solutions:

a positive electrode sheet is provided, including a positive current collector, a heat-sensitive coating, a composite fusion layer and a positive active material layer, where the heat-sensitive coating, the composite fusion layer and the positive active material layer are sequentially arranged on a surface of the positive current collector;

the heat-sensitive coating includes heat-sensitive polymer microspheres, a first conductive agent, a first binder and an auxiliary agent;

the positive active material layer includes a positive active material, a second conductive agent and a second binder; and the composite fusion layer includes the positive active material, the heat-sensitive polymer microspheres, the first conductive agent, the first binder, the second conductive agent, the second binder and the auxiliary agent.

According to the present disclosure, the heat-sensitive coating includes the following components by weight percentage:

1.1-95 wt % of the heat-sensitive polymer microspheres, 2.9-48.9 wt % of the first conductive agent, 2-40 wt % of the first binder and 0.1-10 wt % of the auxiliary agent.

Preferably, the heat-sensitive coating includes the following components by weight percentage:

20-90 wt % of the heat-sensitive polymer microspheres, 6.5-40 wt % of the first conductive agent, 3-30 wt % of the first binder and 0.5-10 wt % of the auxiliary agent.

Further preferably, the heat-sensitive coating includes the following components by weight percentage:

30-80 wt % of the heat-sensitive polymer microspheres, 14-35 wt % of the first conductive agent, 5-30 wt % of the first binder and 1-5 wt % of the auxiliary agent.

Where, in the heat-sensitive coating, the heat-sensitive polymer microspheres account for 1.1-95 vol % (volume percent) of a total volume of the heat-sensitive coating.

Where, a content of the heat-sensitive polymer microspheres by weight percentage is 1.1 wt %, 4 wt %, 9 wt %, 16 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt % and 95 wt %.

Where, a content of the first conductive agent by weight percentage is 2.9 wt %, 3 wt %, 4 wt %, 5 wt %, 8 wt %, 10 wt %, 12 wt %, 15 wt %, 18 wt %, 20 wt %, 22 wt %, 25 wt %, 28 wt %, 30 wt %, 37 wt %, 41 wt % and 48.9 wt %.

Where, a content of the first binder by weight percentage is 2 wt %, 4 wt %, 5 wt %, 8 wt %, 10 wt %, 12 wt %, 15 wt %, 18 wt %, 20 wt %, 22 wt %, 25 wt %, 28 wt %, 30 wt %, 32 wt %, 35 wt %, 38 wt % and 40 wt %.

Where, a content of the auxiliary agent by weight percentage is 0.1 wt %, 0.5 wt %, 1 wt %, 2 wt %, 3 wt %, 4 wt %, 5 wt %, 6 wt %, 7 wt %, 8 wt %, 9 wt % and 10 wt %.

According to the present disclosure, the positive active material layer includes the following components by weight percentage:

80-99 wt % of the positive active material, 0.5-10 wt % of the second conductive agent and 0.5-10 wt % of the second binder.

Preferably, the positive active material layer includes the following components by weight percentage:

84-99 wt % of the positive active material, 0.5-8 wt % of the second conductive agent and 0.5-8 wt % of the second binder.

Further preferably, the positive active material layer includes the following components by weight percentage:

90-98 wt % of the positive active material, 1-5 wt % of the second conductive agent and 1-5 wt % of the second binder.

According to the present disclosure, the composite fusion layer is formed by permeation of the heat-sensitive coating and the positive active material layer into each other during its preparation. Mass fractions of the heat-sensitive polymer microspheres, the first conductive agent, the first binder and the auxiliary agent in the composite fusion layer satisfy: 1.1-95 wt % of the heat-sensitive polymer microspheres, 2.9-48.9 wt % of the first conductive agent, 2-40 wt % of the first binder and 0.1-10 wt % of the auxiliary agent. Further, mass fractions of the positive active material, the second conductive agent and the second binder in the composite fusion layer satisfy: 80-99 wt % of the positive active material, 0.5-10 wt % of the second conductive agent and 0.5-10 wt % of the second binder. Further, the heat-sensitive polymer microspheres and the positive active material have no specific limitation on its respective mass fraction, as long as they are contained at the same time.

According to the present disclosure, a thickness of the current collector is 0.1 μm-20 μm, preferably 2 μm-15 μm, for example, 0.5 μm, 1 μm, 3 μm, 4 μm, 5 μm, 8 μm, 10 μm and 12 μm.

According to the present disclosure, a thickness of the heat-sensitive coating is 0.1 μm-5 μm, preferably 0.2 μm-3 μm, for example, 0.3 μm, 0.5 μm, 0.8 μm, 1.5 μm, 2 μm, 2.5 μm and 3 μm.

According to the present disclosure, a thickness of the composite fusion layer is 0.001-0.5 μm, for example, 0.001 μm, 0.005 μm, 0.01 μm, 0.02 μm, 0.05 μm, 0.08 μm, 0.1 μm, 0.2 μm, 0.3 μm, 0.4 μm and 0.5 μm.

According to the present disclosure, a thickness of the positive active material layer is 5-100 μm, preferably 5 μm-65 μm, for example, 5 μm, 10 μm, 15 μm, 20 μm, 25 μm, 30 μm, 35 μm, 40 μm, 45 μm, 50 μm, 55 μm, 60 μm and 65 μm.

According to the present disclosure, a particle size of the heat-sensitive polymer microsphere is 100 nm-3.0 μm, preferably 200 nm-1.7 μm.

According to the present disclosure, a heat-sensitive temperature of the heat-sensitive polymer microspheres is greater than or equal to 110° C., preferably 115° C.-160° C., for example, 115° C., 120° C., 125° C., 130° C., 135° C., 140° C., 145° C., 150° C. and 160° C.

According to the present disclosure, the heat-sensitive polymer microspheres include a polymer which is selected from at least one of polyethylene, polypropylene, polyamide, polyester amide, polystyrene, polyvinyl chloride, polyester, polyurethane, olefin copolymer and the like or a modified copolymer of monomer thereof. Exemplarily, the olefin copolymer is, for example, a propylene copolymer (such as propylene-ethylene-acrylate copolymer), an ethylene copolymer (such as ethylene-propylene copolymer, ethylene-acrylate copolymer, ethylene-vinyl acetate copolymer and the like). Exemplarily, the heat-sensitive polymer microspheres may include one of the above polymers or a mixture of two or more of the above polymers. Exemplarily, the heat-sensitive polymer microspheres may be one kind of heat-sensitive polymer microsphere or a combination of two or more kinds of heat-sensitive polymer microspheres with the same particle size, or may be a mixture of the same kind of polymer microspheres with different particle sizes or a mixture of different kinds of polymer microspheres with different particle sizes.

According to the present disclosure, the first conductive agent and the second conductive agent are the same or different and are independently selected from one or more of conductive carbon black, Ketjen black, conductive fiber, conductive polymer, acetylene black, carbon nanotube, graphene, flake graphite, conductive oxide and metal particle.

According to the present disclosure, the first binder is selected from a water-based binder and an oil-based binder, where the water-based binder is one or more of acrylate, poly (meth) acrylic acid, styrene butadiene rubber (SBR), polyvinyl alcohol, polyvinyl acetate, carboxymethyl cellulose (CMC), sodium carboxymethyl cellulose (CMC-Na), carboxyethyl cellulose, waterborne polyurethane, ethylene-vinyl acetate copolymer, polyacrylate copolymer, lithium polystyrene sulfonate, aqueous silicone resin, nitrile-polyvinyl chloride blend, styrene-acrylic latex, pure styrene latex, etc., and blend derived from modification of the aforementioned polymers, copolymer derived from modification of the aforementioned polymers; and the oil-based binder is one or more of polytetrafluoroethylene, polyvinylidene fluoride and polyvinylidene fluoride-hexafluoropropylene.

According to the present disclosure, the auxiliary agent is selected from a dispersant and a filler; where the dispersant is at least one of branched chain alcohol, triethyl phosphate, polyethylene glycol, fluorinated polyoxyethylene, polyoxyethylene, stearic acid, sodium dodecyl benzene sulfonate, sodium hexadecyl sulfonate, fatty acid glyceride, sorbitan fatty acid ester and polysorbate; and the filler is a nano-filler (nano-silica, nano-alumina, nano zirconium dioxide, nano boron nitride and nano aluminum nitride, etc.), nano-oxide electrolyte and the like.

According to the present disclosure, the positive active material is selected from one or more of lithium iron phosphate ($LiFePO_4$), lithium cobalt oxide ($LiCoO_2$), lithium nickel cobalt manganate ($Li_zNi_xCo_yMn_{1-x-y}O_2$, where $0.95 \leq z \leq 1.05$, $x>0$, $y>0$ and $0<x+y<1$), lithium manganate ($LiMnO_2$), lithium nickel cobalt aluminate ($Li_zNi_xCo_yAl_{1-x-y}O_2$, where $0.95 \leq z \leq 1.05$, $x>0$, $y>0$ and $0.8 \leq x+y<1$), lithium nickel cobalt manganese aluminate ($Li_zNi_xCo_yMn_wAl_{1-x-y-w}O_2$, where $0.95 \leq z \leq 1.05$, $x>0$, $y>0$, $w>0$, $0.8 \leq x+y+w<1$), nickel cobalt aluminum tungsten material, lithium-rich manganese-based solid solution positive electrode material ($xLi_2MnO_2 \cdot (1-x)LiMO_2$, where M=Ni/Co/Mn), lithium nickel cobalt oxide ($LiNi_xCo_yO_2$, where $x>0$, $y>0$, $x+y=1$), lithium nickel titanium magnesium oxide ($LiNi_xTi_yMg_zO_2$, where $x>0$, $y>0$, $z>0$, $x+y+z=1$), lithium nickel oxide ($Li_2NiO_2$), lithium spinel manganate ($LiMn_2O_4$), and nickel cobalt tungsten material.

According to the present disclosure, the second binder is selected from one or more of polytetrafluoroethylene, polyvinylidene fluoride, and polyvinylidene fluoride-hexafluoropropylene.

According to the present disclosure, a separator resistance of the positive electrode sheet is less than or equal to 10Ω, for example, 40 mΩ-500 mΩ.

The present disclosure further provides a secondary battery which includes the above positive electrode sheet.

According to the present disclosure, when a capacity retention rate of the secondary battery is 80% at 25° C. under 1 C/1 C charging and discharging system, the number of cycles is 800 or more, even 5000 or more, further 5600 or more, and up to 5630 or more.

The present disclosure further provides a preparation method of the above positive electrode sheet, the method includes the following steps.

1) Preparation of an oil-based heat-sensitive coating or a water-based heat-sensitive coating a. Oil-Based Heat-Sensitive Coating 200-1000 parts by mass of an oily solvent, 1.1-95 parts by mass of heat-sensitive polymer microspheres, 2.9-48.9 parts by mass of a first conductive agent, 2-40 parts by mass of an oil-based binder from a first binder, and 0.1-10 parts by mass of an auxiliary agent are uniformly mixed, coated on a surface of a positive current collector, and dried at 80-110° C. for 12-72 hours to obtain a current collector containing the oil-based heat-sensitive coating on its surface.

b. Water-Based Heat-Sensitive Coating 200-1000 parts by mass of water, 1.1-95 parts by mass of the heat-sensitive polymer microspheres, 2.9-48.9 parts by mass of the first conductive agent, 2-40 parts by mass of a water-based binder from the first binder and 0.1-10 parts by mass of the auxiliary agent are uniformly mixed, then coated on a surface of the current collector, and dried at 80-110° C. for 12-72 hours to obtain a current collector containing the water-based heat-sensitive coating on its surface.

2) 200-1000 parts by mass of the oily solvent, 80-99 parts by mass of a positive active material, 0.5-1 parts by mass of a second conductive agent, and 0.5-10 parts by mass of a second binder are uniformly mixed, and then coated on the surface of the current collector containing the oil-based heat-sensitive coating or the water-based heat-sensitive coating in step 1, and dried at 80-110° C. for 12-72 hours to obtain the positive electrode sheet.

According to the present invention, in step 1), it is preferably performed using the following method.

a. Oil-Based Heat-Sensitive Coating 200-1000 parts by mass of an oil-based solvent, 2.9-48.9 parts by mass of a first conductive agent, 2-40 parts by mass of an oil-based binder from a first binder, and 0.1-10 parts by mass of an auxiliary agent are uniformly mixed and filtered through a 100 mesh screen to obtain a filtrate. 1.1-95 parts by mass of heat-sensitive polymer microspheres are added to the filtrate, uniformly mixed and filtered through the 100 mesh screen again, coated on a surface of a positive current collector, and dried at 80-110° C. for 12-72 hours to obtain the current collector containing the oil-based heat-sensitive coating on its surface.

b. Water-Based Heat-Sensitive Coating 200-1000 parts by mass of water, 2.9-48.9 parts by mass of the first conductive agent, 2-40 parts by mass of a water-based binder from the first binder and 0.1-10 parts by mass of the auxiliary agent are uniformly mixed and filtered through a 100 mesh screen to give a filtrate. 1.1-95 parts by mass of heat-sensitive polymer microspheres are added to the filtrate, uniformly mixed and filtered through the 100 mesh screen again, coated on a surface of the positive current collector, and dried at 80-110° C. for 12-72 hours to obtain the current collector containing the water-based heat-sensitive coating on its surface.

According to the present disclosure, the oil-based solvent is selected from at least one of N-methylpyrrolidone, hydrofluoroether, acetone, tetrahydrofuran, dichloromethane and pyridine.

Beneficial Effects

The present disclosure provides a positive electrode sheet containing a high-safety heat-sensitive coating and a lithium-ion battery containing the positive electrode sheet. The heat-sensitive coating includes a first conductive agent, a first binder, heat-sensitive polymer microspheres and an auxiliary agent. The heat-sensitive coating has a conductive property at normal temperature, and at the same time has advantages of increasing a contact area between an active material and a current collector, improving the conductivity, and effectively reducing the polarization of the battery and the like. When the use temperature of the positive electrode sheet reaches 120° C. and above, the heat-sensitive polymer microspheres may be melted to form a plurality of continuous electron blocking layers, the morphology of the heat-sensitive polymer microspheres will change, and current blocking occurs in the coating, thereby forming an internal blocking inside the battery, preventing the occurrence of further thermal runaway of the lithium-ion battery, and further improving the safety performance of secondary battery.

DESCRIPTION OF EMBODIMENTS

Figure 1:
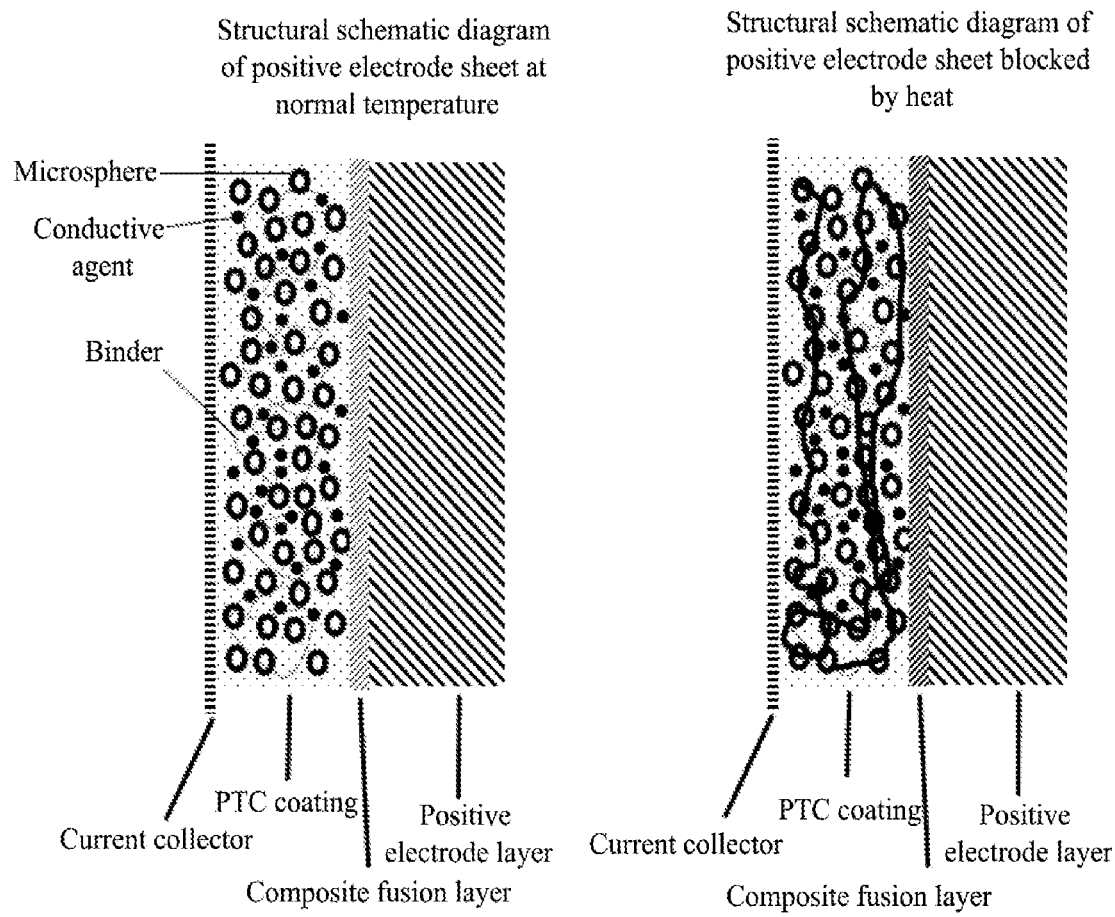
FIG. 1 is a structural schematic diagram of a positive electrode sheet of the present disclosure.
Figure 2:
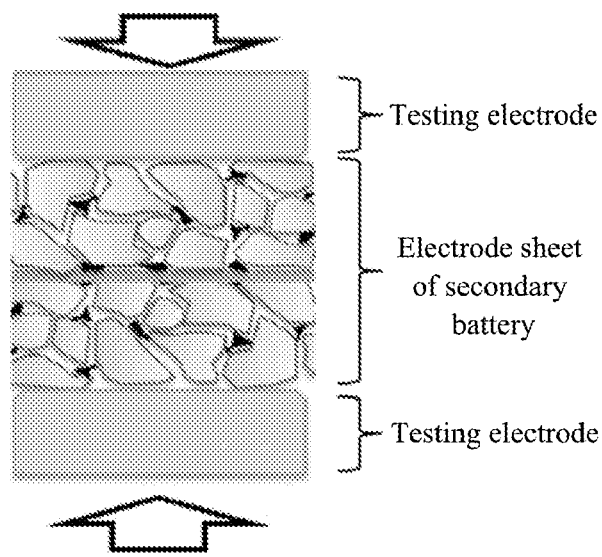
FIG. 2 is a schematic diagram of a resistance test of a positive electrode sheet of the present disclosure.

The present disclosure will be described in further detail below in connection with specific examples. It should be understood that the following examples are merely intended to exemplarily illustrate and explain the disclosure, and should not be construed as limiting the protection scope of the present disclosure. All techniques implemented on the basis of the above content of the present disclosure are encompassed within the scope of the present disclosure intended to be protected.

The experimental methods used in the following examples are conventional methods unless otherwise specified; the reagents, materials and the like used in the following examples, unless otherwise specified, may be obtained from the commercial route. All heat-sensitive polymer microspheres used in the following examples are purchased from the commercial route.

In the description of the present disclosure, it should be noted that terms "first", "second" and the like are only for the purpose of description, instead of indicating or implying the relative importance.

Example 1

S1: preparing heat-sensitive coating slurry: 1000 g of hydrofluoroether, 2.9 g of CNT (Carbon Nano Tube), 2 g of polyvinylidene fluoride and 0.1 g of triethyl phosphate were uniformly mixed and filtered through a 100 mesh screen to give a filtrate; 95 g of heat-sensitive polymer microspheres of polyethylene with a particle size of 1.5 μm were added to the filtrate, uniformly mixed and filtered through the 100 mesh screen again to obtain the heat-sensitive coating slurry.

S2: preparing a positive active material layer slurry: 500 g of NMP (N-Methylpyrrolidone), 96 g of lithium cobaltate, 2 g of conductive carbon black as a conductive agent, and 2 g of polyvinylidene fluoride as a binder were uniformly mixed to obtain the positive active material layer slurry.

S3: preparing a positive electrode sheet: the heat-sensitive coating slurry in S1 was coated on a surface of an aluminum foil current collector, and dried at 110° C. for 12 h to obtain the current collector having the heat-sensitive coating on its surface; the positive active material layer slurry in S2 was coated on the surface of the current collector having the heat-sensitive coating on its surface, dried, and subjected to tableting and cutting treatments to obtain the positive electrode sheet, where the heat-sensitive coating and the positive active material layer were permeated into each other to form a composite fusion layer during drying and tableting, and the thickness of the composite fusion layer was observable by SEM and EDS (Energy Dispersive Spectrometer) analysis.

S4: preparing a negative electrode sheet: 400 g of deionized water, 97 g of graphite, 0.5 g of conductive carbon black, 1 g of CMC, 1.5 g of styrene-butadiene rubber were uniformly mixed, coated on the negative current collector, and dried, where the drying process belonged to a conventional process in the art.

S5: preparing a lithium-ion battery: the obtained positive electrode sheet, the obtained negative electrode sheet and a separator were subjected to laminating, winding, etc. to give a lithium-ion battery cell, followed by drying, electrolyte injection, formation, and encapsulation to obtain the lithium-ion battery with high safety.

Example 2

S1: preparing a heat-sensitive coating slurry: 200 g of water, 10 g of acetylene black, 20 g of CNT, 30 g of styrene-butadiene rubber, 10 g of carboxymethyl cellulose and 10 g of polyethylene glycol were uniformly mixed and filtered through a 100 mesh screen to give a filtrate; 16.7 g of heat-sensitive polymer microspheres of ethylene-propylene copolymer with a particle size of 1.5 μm and 3.3 g of heat-sensitive polymer microspheres of ethylene-propylene copolymer with a particle size of 1.2 μm were added to the filtrate, uniformly mixed and then filtered through a 100 mesh screen again to obtain the heat-sensitive coating slurry.

S2: preparing a positive active material layer slurry: 500 g of NMP, 96 g of lithium cobaltate, 2 g of conductive carbon black as the conductive agent, 2 g of polyvinylidene fluoride as the binder were uniformly mixed to obtain the positive active material layer slurry.

S3: preparing a positive electrode sheet: the heat-sensitive coating slurry in S1 was coated on a surface of an aluminum foil current collector, and dried at 80° C. for 72 h to obtain the current collector having the heat-sensitive coating on its surface; the positive active material layer slurry in S2 was coated on the surface of the current collector having the heat-sensitive coating on its surface, dried, and subjected to tableting and cutting treatments to obtain the positive electrode sheet.

S4: preparing a negative electrode sheet: 350 g of deionized water, 90 g of graphite, 7 g of silicon monoxide ($SiO_x$, $0<x<2$), 0.5 g of conductive carbon black, 1 g of CMC, 1.5 g of styrene-butadiene rubber were uniformly mixed, coated on a negative current collector, and dried, where the drying process belonged to a conventional process in the art.

S5: preparing a lithium-ion battery: the obtained positive electrode sheet, the obtained negative electrode sheet and a separator were subjected to laminating, winding, etc. to give a lithium-ion battery cell, followed by drying, electrolyte injection, formation, and encapsulation to obtain the lithium-ion battery with high safety.

Examples 3-12 and Comparative Examples 1-2

The preparing process refers to the preparation of the oil-based heat-sensitive coating in Example 1 or refers to the preparation of the water-based heat-sensitive coating in Example 2, and the distinguishing features are shown in Table 1-Table 3.

TABLE 1

Addition amounts and drying conditions of heat-sensitive coating components in Examples 1-12 and Comparative Examples 1-2

| No. | Solvent/g | Heat-sensitive polymer microsphere/g | Conductive agent/g | Binder/g | Auxiliary agent/g | Drying temperature (h) | Drying time (h) |
|---|---|---|---|---|---|---|---|
| Example 1 | 1000 | 95 | 2.9 | 2 | 0.1 | 110 | 12 |
| Example 2 | 200 | 20 | 30 | 40 | 10 | 80 | 72 |
| Example 3 | 500 | 1.1 | 48.9 | 40 | 10 | 85 | 18 |
| Example 4 | 400 | 76 | 10 | 10 | 4 | 100 | 20 |
| Example 5 | 800 | 65 | 22 | 10 | 3 | 90 | 24 |
| Example 6 | 300 | 52 | 26 | 15 | 7 | 95 | 60 |
| Example 7 | 500 | 46 | 35 | 15 | 4 | 100 | 70 |
| Example 8 | 700 | 35 | 40 | 20 | 5 | 105 | 36 |
| Example 9 | 600 | 38 | 34 | 20 | 8 | 90 | 50 |
| Example 10 | 600 | 70 | 20 | 8 | 2 | 100 | 48 |
| Example 11 | 600 | 70 | 20 | 8 | 2 | 100 | 48 |
| Example 12 | 600 | 70 | 20 | 8 | 2 | 100 | 48 |
| Comparative Example 1 | — | — | — | — | — | — | — |
| Comparative Example 2 | 600 | — | 20 | 8 | 2 | 100 | 48 |

TABLE 2

Composition of heat-sensitive coating slurries in
Examples 1-12 and Comparative Examples 1-2

| No. | Solvent | Heat-sensitive polymer microsphere | Heat sensitive temperature (° C.) | Conductive agent | Binder | Auxiliary agent |
|---|---|---|---|---|---|---|
| Example 1 | Hydrofluoroether | Polyethylene | 130 | CNT | Polyvinylidene fluoride | Triethyl phosphate |
| Example 2 | Water | Ethylene-propylene copolymer with the particle size of 1.5 μm and ethylene-propylene copolymer with the particle size of 1.2 μm at a mass ratio of 6:1 | 135 | Acetylene black: carbon nano-tube (a mass ratio of E2) | Styrene-butadiene rubber: carboxymethyl cellulose (a mass ratio of 3:1) | Polyethylene glycol |
| Example 3 | Acetone | Polypropylene | 140 | Conductive carbon black: graphene (a mass ratio of 1:2) | Polyvinylidene fluoride-hexafluoropropylene | Sodium dodecyl benzene sulfonate |
| Example 4 | Water | Polyethylene | 115 | Graphene: carbon nano-tube (a mass ratio of 1:4) | Styrene-butadiene rubber: carboxymethyl cellulose (a mass ratio of 1:1) | Polyethylene glycol |
| Example 5 | Acetone | Polypropylene | 160 | Acetylene black | Polyvinylidene fluoride | Sodium dodecyl benzene sulfonate |
| Example 6 | Tetrahydrofuran | Ethylene-vinyl acetate Copolymer | 130 | Conductive carbon black | Polyvinylidene fluoride | Sodium hexadecyl sulfonate |
| Example 7 | Water | Polyurethane | 130 | Carbon nano tube | Acrylate | Polyoxyethylene |
| Example 8 | Water | Propylene-ethylene-acrylate copolymer | 115 | Carbon nano tube: Conductive carbon black (a mass ratio of 1:2) | Ethylene-vinyl acetate copolymer | Stearic acid |
| Example 9 | Pyridine | Propylene-ethylene-acrylate copolymer | 135 | Conductive carbon black: graphene (a mass ratio of 1:2) | Polytetrafluoroethylene | Branched chain alcohol |
| Example 10 | Water | Polyethylene | 120 | Conductive carbon black | Styrene-butadiene rubber: carboxymethyl cellulose (a mass ratio of 1:1) | Polyethylene glycol |
| Example 11 | Water | Polyethylene | 120 | Conductive carbon black | Styrene-butadiene rubber: carboxymethyl cellulose (a mass ratio of 1:1) | Polyethylene glycol |

TABLE 2-continued

Composition of heat-sensitive coating slurries in
Examples 1-12 and Comparative Examples 1-2

| No. | Solvent | Heat-sensitive polymer microsphere | Heat sensitive temperature (° C.) | Conductive agent | Binder | Auxiliary agent |
|---|---|---|---|---|---|---|
| Example 12 | Water | Polyethylene | 120 | Conductive carbon black | Styrene-butadiene rubber: carboxymethyl cellulose (a mass ratio of 1:1) | Polyethylene glycol |
| Comparative Example 1 | — | — | — | — | — | — |
| Comparative Example 2 | — | — | — | Carbon nano-tube: conductive carbon black (1:1) | Styrene-butadiene rubber: carboxymethyl cellulose (1:1) | Polyethylene glycol |

TABLE 3

Structures of positive electrode sheets in
Examples 1-12 and Comparative Examples 1-2

| No. | Thickness of current collector/(μm) | Thickness of heat-sensitive coating/(μm) | Thickness of fusion layer/(μm) | Thickness of positive electrode layer/(μm) |
|---|---|---|---|---|
| Example 1 | 12 | 2.5 | 0.5 | 50 |
| Example 2 | 13 | 2 | 0.08 | 100 |
| Example 3 | 10 | 0.2 | 0.01 | 15 |
| Example 4 | 20 | 0.5 | 0.5 | 45 |
| Example 5 | 2 | 1 | 0.4 | 80 |
| Example 6 | 5 | 2 | 0.1 | 60 |
| Example 7 | 10 | 4 | 0.005 | 45 |
| Example 8 | 11 | 0.5 | 0.5 | 50 |
| Example 9 | 15 | 5 | 0.001 | 70 |
| Example 10 | 10 | 3 | 0.01 | 50 |
| Example 11 | 10 | 3 | 0.01 | 60 |
| Example 12 | 10 | 1 | 0.5 | 50 |
| Comparative Example 1 | 10 | — | — | 50 |
| Comparative Example 2 | 10 | 3 | 0.001 | 50 |

Experimental Data

A resistance test of an electrode sheet: ACCFILM film resistance test instrument is used, where the instrument uses a voltage-controllable dual-probe resistance to directly test the overall resistance of the electrode sheet, and the output measurement value is the resistance of electrode sheet.

Figure 3:
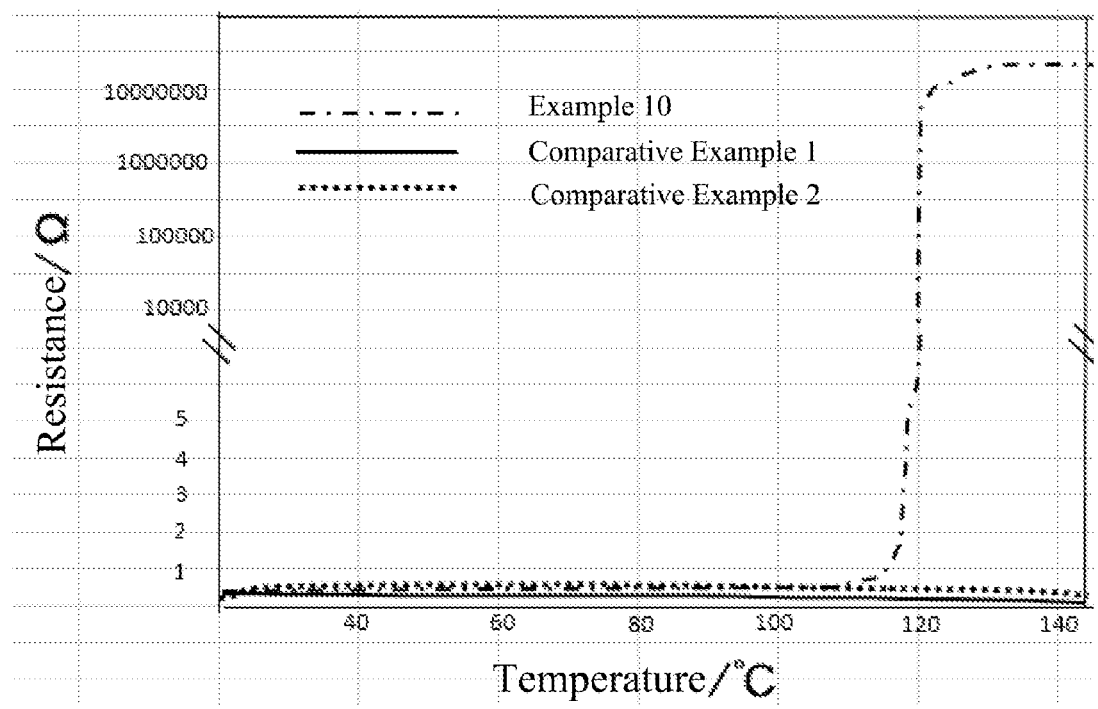
FIG. 3 is a graph showing resistance test results of positive electrode sheets of Example 10, Comparative Example 1, and Comparative Example 2.

The test process includes: allowing the probe to have a proper surface smoothness, pressurizing the probes with 10N, and performing a test, where the test instrument was placed in an oven with an initial temperature of 20° C., the temperature of oven is raised to 145° C. at a heating rate of 2° C./min, the data is recorded in real time, and the result is as shown in FIG. 3.

A method for testing the internal resistance of battery by alternating current impedance includes: performing an alternating current impedance test on the lithium-ion battery with PGSTAT302N chemical workstation of Metrohm in the range of 100 KHz-0.1 mHz at 25° C.

A test method of the cycle performance of battery includes: performing a charging and discharging test on the lithium-ion battery on cabinet of LAND battery charging and discharging test instrument under test conditions of 25° C., 50.0% humidity and charging and discharging at 1 C/1 C.

A thermal test method of battery includes: detecting battery states at different temperatures by an adiabatic rate calorimeter PhiTEC I (ARC) of HEL, England.

A test method of a cross-section of the electrode sheet of battery includes: coating a heat-sensitive coating slurry on an aluminum foil current collector, then coating a positive active material layer slurry, drying, subjecting a sample to cross-cutting, vacuuming, spraying with gold, preparing sample, and observing the cross-section of the coating area by Hitachi thermal field emission scanning electron microscope SU5000.

1. Electrode sheet resistance test result: FIG. 3 is a graph of a change of the resistance values of positive electrode sheets in Example 10, Comparative Example 1 and Comparative Example 2 as a function of the temperature. In FIG. 3, from comparison of the resistance test results of the positive electrode sheets of Example 10, Comparative Example 1, and Comparative Example 2, it is found that the resistances of the positive electrode sheets of Comparative Example 1 and Comparative Example 2 slightly decrease as the temperature increases; and the resistance of the positive electrode sheet of Example 10 changes little along with the temperature in the range of 20° C.-115° C. At 115° C.-125° C., the heat-sensitive polymer microspheres in the positive electrode sheet of Example 10 will melt to form a plurality of continuous electron blocking layers, current blocking occurs in the heat-sensitive coating and an internal blocking is formed inside the battery, thereby blocking the flow of ions and electrons, forming a heat-sensitive effect, and further improving the safety performance of battery.

Figure 4:
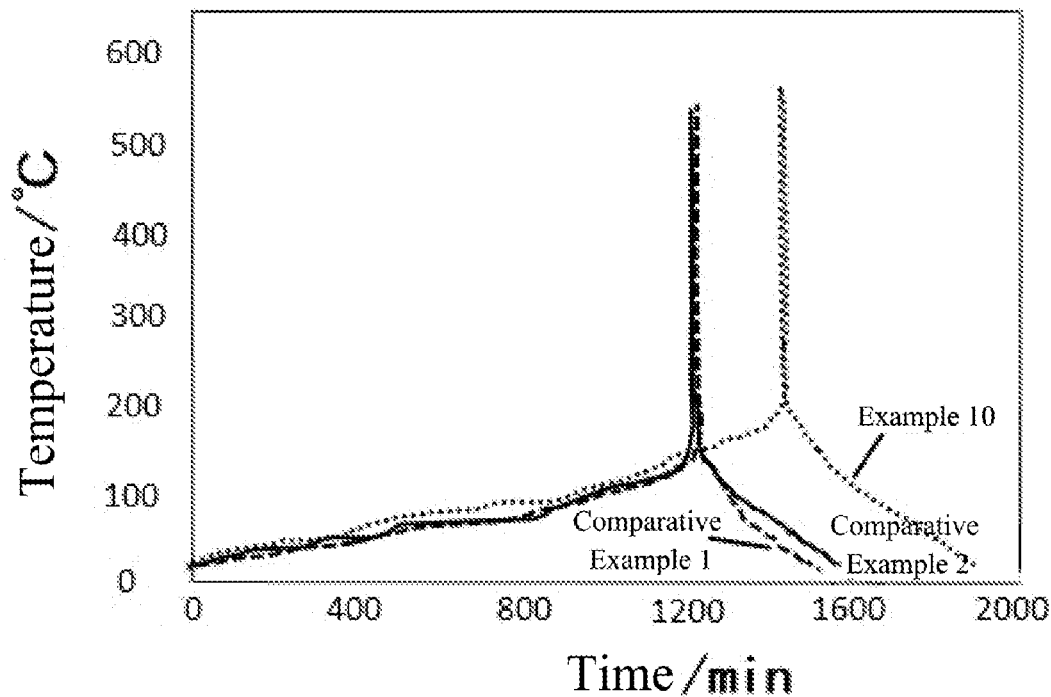
FIG. 4 is a graph showing results of ARC test of batteries prepared in Example 10 and Comparative Examples 1-2.

2. The batteries prepared in Example 10 and Comparative Examples 1-2 are tested with an adiabatic acceleration calorimeter PhiTEC I (ARC) of HEL, England. The internal temperature of the instrument is increased at a rate of 0.14° C./min, and the temperature of battery is tested, where the test results are as shown in FIG. 4. By comparing the ARC test results of the batteries prepared in Example 10 and Comparative Examples 1-2, it is found that a thermal runaway occurs at about 180° C. in the batteries of Comparative Examples 1-2, and the batteries burn violently; and the thermal runaway occurs at about 200° C. in the battery of Example 10.

Main reasons: during the temperature of battery rising from 100° C. to 180° C., there exists SEI (solid electrolyte interface) film cracks and intense reaction of the positive electrode with the electrolyte, especially in a range of 160° C.-180° C., the phenomena such as severe thermal runaway and fire may occur. With respect to the battery of the present disclosure, during the battery temperature rising from 100° C. to 180° C., when reaching the heat-sensitive temperature, a blocking layer is formed inside the battery, which can effectively reduce the effects of the cracking of the SEI film and the thermal reaction between the positive electrode and the electrolyte on the battery, prolong the safety time of battery, and increase the thermal runaway temperature of battery.

3. The batteries prepared in Examples 1-12 and Comparative Examples 1-2 are subjected to an EIS (Electrochemical Impedance Spectroscopy) test and a battery cycle performance test, and the test results are as follows:

| Serial number | Internal resistance of battery (mΩ) | Cycle numbers at 80% capacity retention |
|---|---|---|
| Example 1 | 46.35 | 1190 |
| Example 2 | 70.49 | 830 |
| Example 3 | 10.25 | 5630 |
| Example 4 | 34.21 | 1620 |
| Example 5 | 53.76 | 940 |
| Example 6 | 46.25 | 1010 |
| Example 7 | 35.34 | 1535 |
| Example 8 | 44.91 | 1300 |
| Example 9 | 49.57 | 1030 |
| Example 10 | 45.72 | 1200 |
| Example 11 | 47.82 | 960 |
| Example 12 | 44.14 | 1170 |
| Comparative Example 1 | 43.93 | 1000 |
| Comparative Example 2 | 46.14 | 1150 |

By comparing EIS test results of the batteries prepared in Examples 1-12 and Comparative Examples 1-2, it is found that:

1) In the batteries prepared in Examples 1-12, a thickness of the positive layer, that is, the positive active material layer, in the positive electrode sheet increases, and an internal resistance of the battery increased accordingly. The main reason is that increased thickness of the electrode sheet results in the increase of the transmission paths of lithium ions and electrons, and the increase of the impedance of the battery, thereby causing the decrease of the effective cycle of battery. However, the internal resistance and cycling performance of the batteries prepared in Examples 1-12 meet the requirements of conventional projects.

2) For the batteries prepared in Examples 10-12, the difference of batteries in Examples 10-11 lies in that the thicknesses of the positive layers in the positive electrode sheets are different, where, compared with Example 10, the thickness of the positive electrode layer in the positive electrode sheet in Example 11 increases by 10 μm, the transmission paths of lithium ions and electrons in the electrode sheet increase, the impedance of the battery increases, and the cyclic performance of the battery slightly decreases, but meets the use requirements of the conventional projects; and the difference of batteries in Example 10 and Example 12 lies in that the thicknesses of the heat-sensitive coatings are different, where, compared with Example 10, the thickness of the heat-sensitive coating in Example 12 decreases by 2 μm, which has little effect on the performance of battery and belongs to the normal range.

3) Experimental Results of Example 10, Comparative Example 1 and Comparative Example 2:

Internal resistance of battery: Comparative Example 1<Example 10<Comparative Example 2, the main reason for this lies in that there is no bottom coating in the positive electrode sheet in Comparative Example 1, resulting in a relatively low internal resistance of battery. Overall, there is little difference between the internal resistances of their batteries.

Cycle number of battery: Example 10≈Comparative Example 2>Comparative Example 1, the main reason is that there is no bottom coating in the positive electrode sheet Comparative Example 1, and although the internal resistance of battery in the early stage is slightly small, the battery cycle performance will be affected by the battery polarization, the increase of dynamic internal resistance, the unevenness of positive electrode and so son along with the cycling of battery.

By comparing the cycle performance test results of batteries prepared in Examples 1-12 and Comparative Examples 1-2, it is found that the coating in the positive electrode sheet of the present disclosure has the following advantages: suppressing the polarization of battery and reducing the increase of dynamic internal resistance in the cycle process; the structure of the battery in the present disclosure can improve the consistency of positive electrode and increase the cycle life of battery; the present disclosure adopts a multi-layer structure of positive electrode sheet, thereby avoiding direct contact between the positive electrode layer and the current collector; and the heat-sensitive coating of the present disclosure can enhance the adhesion force between the positive active material and the current collector, and reduce the manufacturing cost of the electrode sheet.

Figure 5:
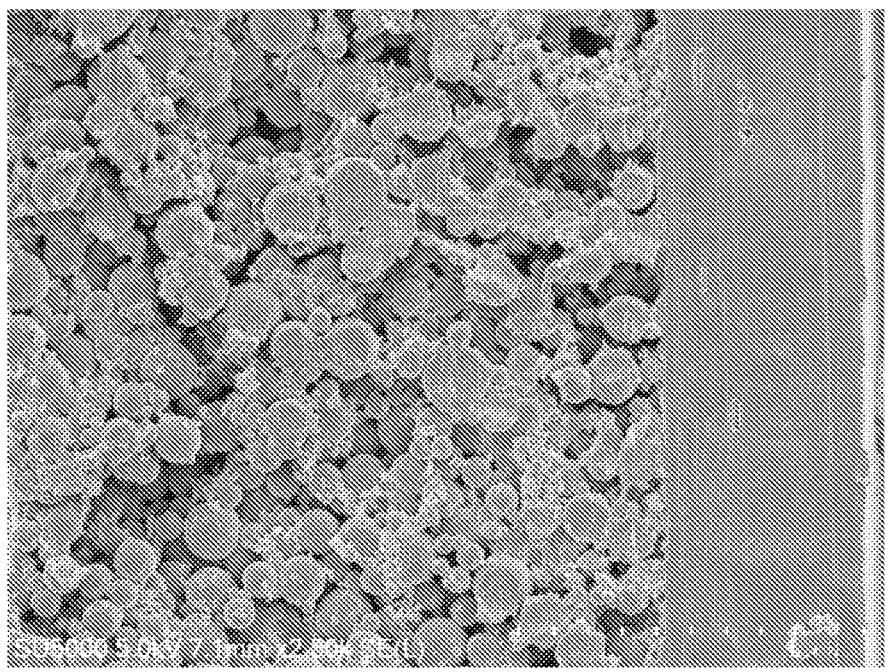
FIG. 5 is an SEM image of a cross-section of a coating area in a positive electrode sheet prepared in Example 1.
Figure 6:
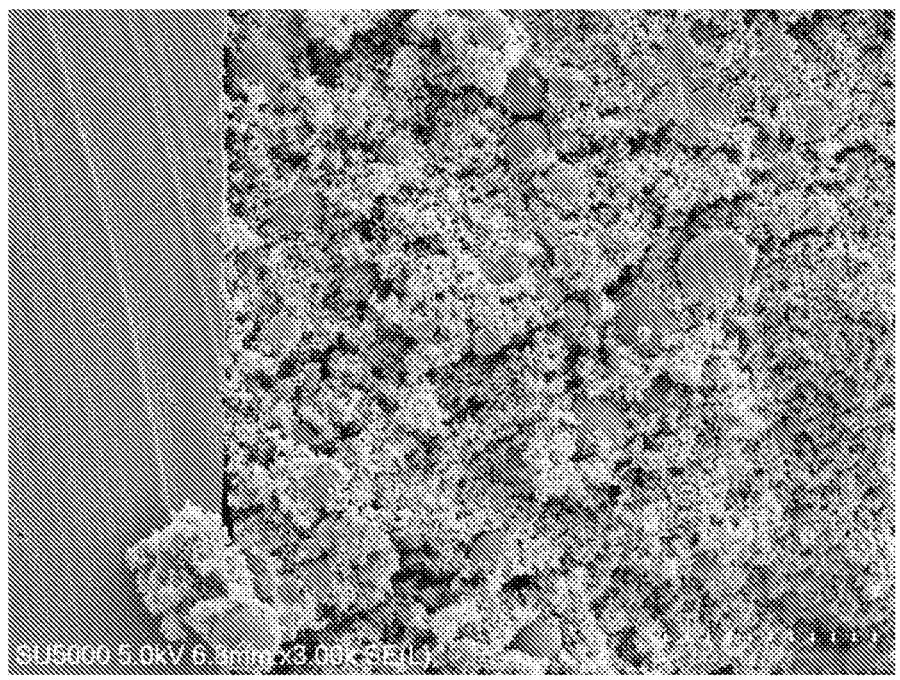
FIG. 6 is an SEM image of a cross-section of a coating area in a positive electrode sheet prepared in Example 8.
Figure 7:
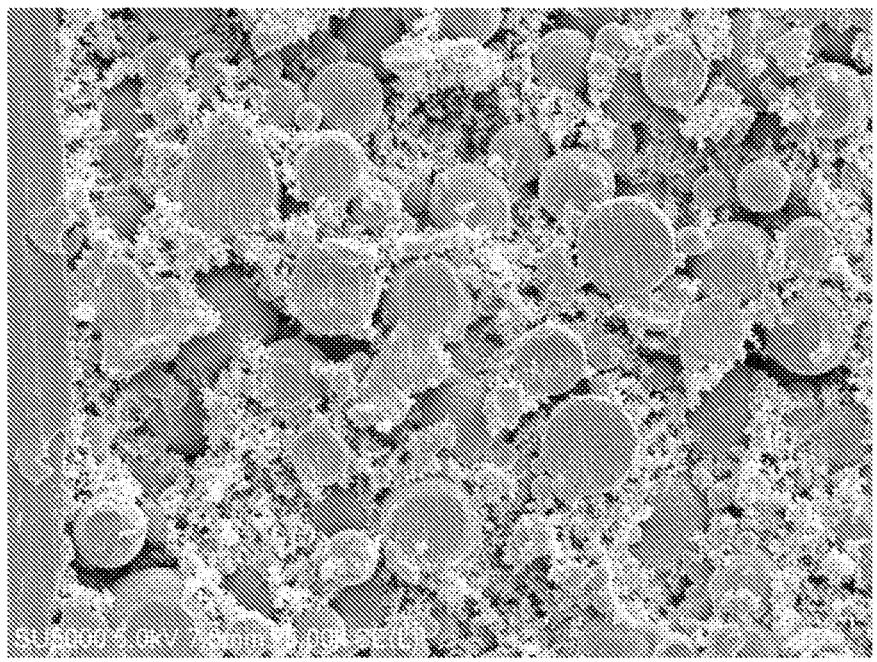
FIG. 7 is an SEM image of a cross-section of a coating area in a positive electrode sheet prepared in Example 10.

4. The cross sections of the heat-sensitive coating areas in the positive electrode sheets prepared in Example 1, Example 8 and Example 10 are observed by Hitachi new thermal field emission scanning electron microscope SU5000. The test results are as shown in FIG. 5, FIG. 6 and FIG. 7.

By comparing the cross-sectional SEM test results of the heat-sensitive coating areas of Example 1, Example 8 and Example 10, it is found that the heat-sensitive microspheres in the heat-sensitive coating of Example 1 account for about 95 vol % of the total volume of the heat-sensitive coating; the heat-sensitive microspheres in the heat-sensitive coating of Example 8 account for about 35 vol % of the total volume of the heat-sensitive coating; and the heat-sensitive microspheres in the heat-sensitive coating of Example 10 accounted for about 70 vol % of the total volume of the heat-sensitive coating.

The experimental results show that the lithium-ion battery assembled with the positive electrode sheet in the present disclosure has better safety compared with the conventional lithium-ion battery.

As above, the implementations of the present disclosure have been described. However, the present disclosure is not limited to the above implementations. Any modification, equivalent replacement and improvement made within the spirit and the principle of the present disclosure shall be included within the protection scope of the present disclosure.

What is claimed is:

1. A positive electrode sheet, comprising a positive current collector, a heat-sensitive coating, a composite fusion layer, and a positive active material layer, wherein the heat-sensitive coating, the composite fusion layer, and the positive active material layer are sequentially arranged on a surface of the positive current collector;

the heat-sensitive coating comprises heat-sensitive polymer microspheres, a first conductive agent, a first binder and an auxiliary agent;

the positive active material layer comprises a positive active material, a second conductive agent and a second binder;

a thickness of the composite fusion layer is 0.001-0.5 μm;

the composite fusion layer comprises the positive active material, the heat-sensitive polymer microspheres, the first conductive agent, the first binder, the second conductive agent, the second binder, and the auxiliary agent;

a particle size of the heat-sensitive polymer microsphere is 100 nm-3.0 μm; and a separator resistance of the positive electrode sheet is less than 10Ω wherein a use temperature of the positive electrode sheet reaches a heat-sensitive temperature and above, the heat-sensitive polymer microspheres are melted to form a plurality of continuous electron blocking layers, the morphology of the heat sensitive polymer microspheres changes and current blocking occurs in the heat sensitive coating, forming an internal blocking inside a secondary battery, preventing the occurrence of further thermal runaway of the secondary battery.

2. The positive electrode sheet according to claim 1, wherein the heat-sensitive coating comprises the following components by weight percentage: 1.1-95 wt % of the heat-sensitive polymer microspheres, 2.9-48.9 wt % of the first conductive agent, 2-40 wt % of the first binder and 0.1-10 wt % of the auxiliary agent.

3. The positive electrode sheet according to claim 1, wherein the positive active material layer comprises the following components by weight percentage: 80-99 wt % of the positive active material, 0.5-10 wt % of the second conductive agent and 0.5-10 wt % of the second binder.

4. The positive electrode sheet according to claim 2, wherein the positive active material layer comprises the following components by weight percentage: 80-99 wt % of the positive active material, 0.5-10 wt % of the second conductive agent and 0.5-10 wt % of the second binder.

5. The positive electrode sheet according to claim 2, wherein a thickness of the current collector is 0.1 μm-20 μm; and/or a thickness of the heat-sensitive coating is 0.1 μm-5 μm; and/or a thickness of the positive active material layer is 5-100 μm.

6. The positive electrode sheet according to claim 3, wherein a thickness of the current collector is 0.1 μm-20 μm; and/or a thickness of the heat-sensitive coating is 0.1 μm-5 μm; and/or a thickness of the positive active material layer is 5-100 μm.

7. The positive electrode sheet according to claim 1, wherein a heat-sensitive temperature of the heat-sensitive polymer microsphere is 115° C.-160° C.

8. The positive electrode sheet according to claim 2, wherein a heat-sensitive temperature of the heat-sensitive polymer microsphere is 115° C.-160° C.

9. The positive electrode sheet according to claim 1, wherein the heat-sensitive polymer microsphere is selected from at least one of polyethylene, polypropylene, polyamide, polyester amide, polystyrene, polyvinyl chloride, polyester, polyurethane, olefin copolymer or copolymer modified by monomer thereof.

10. The positive electrode sheet according to claim 2, wherein the heat-sensitive polymer microsphere is selected from at least one of polyethylene, polypropylene, polyamide, polyester amide, polystyrene, polyvinyl chloride, polyester, polyurethane, olefin copolymer or copolymer modified by monomer thereof.

11. The positive electrode sheet according to claim 1, wherein in the heat-sensitive coating, the heat-sensitive polymer microspheres account for 1.1-95 vol % of a total volume of the heat-sensitive coating.

12. The positive electrode sheet according to claim 2, wherein in the heat-sensitive coating, the heat-sensitive polymer microspheres account for 1.1-95 vol % of a total volume of the heat-sensitive coating.

13. A secondary battery, comprising the positive electrode sheet according to claim 1.

* * * * *